United States Patent
Guo et al.

(10) Patent No.: US 12,007,664 B2
(45) Date of Patent: Jun. 11, 2024

(54) TRANSPARENT DISPLAY PANEL, DISPLAY DEVICE, AND GLASSES

(71) Applicant: BOE TECHNOLOGY GROUP CO., LTD., Beijing (CN)

(72) Inventors: Yujiao Guo, Beijing (CN); Wei Wang, Beijing (CN); Xianqin Meng, Beijing (CN); Qiuyu Ling, Beijing (CN); Meng Yan, Beijing (CN); Yishan Tian, Beijing (CN); Gaolei Xue, Beijing (CN); Weiting Peng, Beijing (CN); Xiaochuan Chen, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 365 days.

(21) Appl. No.: 17/435,011

(22) PCT Filed: Dec. 30, 2020

(86) PCT No.: PCT/CN2020/141614
§ 371 (c)(1),
(2) Date: Aug. 30, 2021

(87) PCT Pub. No.: WO2021/196790
PCT Pub. Date: Oct. 7, 2021

(65) Prior Publication Data
US 2022/0317542 A1 Oct. 6, 2022

(30) Foreign Application Priority Data
Mar. 31, 2020 (CN) .......................... 202010244735.4

(51) Int. Cl.
*G02F 1/29* (2006.01)
*G02B 27/01* (2006.01)

(52) U.S. Cl.
CPC ......... *G02F 1/294* (2021.01); *G02B 27/0172* (2013.01); *G02B 2027/0178* (2013.01)

(58) Field of Classification Search
CPC ................ G02F 1/294; G02B 27/0172; G02B 2027/0178
See application file for complete search history.

(56) References Cited

U.S. PATENT DOCUMENTS

| 2012/0105747 A1 | 5/2012 | Biring |
| 2019/0018244 A1 | 1/2019 | Tan |

(Continued)

FOREIGN PATENT DOCUMENTS

| CN | 102466888 A | 5/2012 |
| CN | 105676314 A | 6/2016 |

(Continued)

OTHER PUBLICATIONS

The First Office Action of Priority Application No. CN 202010244735.4 issued by the Chinese Patent Office on Apr. 1, 2021.

(Continued)

*Primary Examiner* — Nathanael R Briggs
(74) *Attorney, Agent, or Firm* — IP & T GROUP LLP

(57) ABSTRACT

A transparent display panel has a plurality of sub-pixel regions, which are divided into at least two display unit groups. The transparent display panel includes a first substrate and a second substrate assembled with each other, and a light exit control layer disposed therebetween. The first substrate includes a first base and a dimming component disposed on a side of the first base. The dimming component includes a plurality of dimming lenses. Each dimming lens is configured to transmit exit light of one sub-pixel region to human eyes and focus the exit light on a corresponding focal plane. The plurality of dimming lenses are configured to focus exit light of the at least two display unit groups on (Continued)

different focal planes. The focal planes are located at a side of the transparent display panel away from the human eyes.

17 Claims, 10 Drawing Sheets

(56) References Cited

U.S. PATENT DOCUMENTS

| | | | |
|---|---|---|---|
| 2019/0094575 A1* | 3/2019 | Wang | G02F 1/1326 |
| 2020/0068191 A1* | 2/2020 | Yu | G02B 27/0176 |
| 2020/0183202 A1 | 6/2020 | Tan | |
| 2021/0157151 A1 | 5/2021 | Xie et al. | |
| 2021/0232000 A1 | 7/2021 | Zhang et al. | |
| 2021/0364799 A1 | 11/2021 | Guo et al. | |

FOREIGN PATENT DOCUMENTS

| | | | |
|---|---|---|---|
| CN | 105911747 A | | 8/2016 |
| CN | 106292052 A | | 1/2017 |
| CN | 106526864 A | | 3/2017 |
| CN | 206096694 U | | 4/2017 |
| CN | 106646905 A | | 5/2017 |
| CN | 106647093 A | | 5/2017 |
| CN | 107884940 A | | 4/2018 |
| CN | 107908013 A | | 4/2018 |
| CN | 109445176 A | | 3/2019 |
| CN | 109633905 A | | 4/2019 |
| CN | 109709675 A | | 5/2019 |
| CN | 109725462 A | | 5/2019 |
| CN | 109803133 A | | 5/2019 |
| CN | 209400831 U | | 9/2019 |
| CN | 110515215 A | | 11/2019 |
| CN | 110515215 A | * | 11/2019 |
| CN | 110703456 A | | 1/2020 |
| CN | 111290164 A | | 6/2020 |
| WO | 2008/065569 A1 | | 6/2008 |
| WO | 2019/173357 A1 | | 9/2019 |

OTHER PUBLICATIONS

Decision of Rejection of Priority Application No. CN 202010244735.4 issued by the Chinese Patent Office on Jul. 22, 2021.

* cited by examiner

TRANSPARENT DISPLAY PANEL, DISPLAY DEVICE, AND GLASSES

CROSS-REFERENCE TO RELATED APPLICATIONS

This application is a national phase entry under 35 USC 371 of International Patent Application No. PCT/CN 2020/141614, filed on Dec. 30, 2020, which claims priority to Chinese Patent Application No. 202010244735.4, filed on Mar. 31, 2020, which are incorporated herein by reference in their entirety.

TECHNICAL FIELD

The present disclosure relates to the field of display technologies, and to a transparent display panel, a display device, and glasses.

BACKGROUND

Augmented reality (AR) display technologies may realize superimposition display of virtual information and a real scene. For example, a user may superimpose the virtual information onto a real world through AR glasses, so that human eyes see a virtual object and a real environment at the same time, and mutual complementation of the two kinds of information is realized, thereby realizing interaction with the real world.

SUMMARY

In an aspect, a transparent display panel is provided. The transparent display panel has a plurality of sub-pixel regions, and the plurality of sub-pixel regions are divided into at least two display unit groups. The transparent display panel includes a first substrate and a second substrate assembled with each other, and a light exit control layer disposed between the first substrate and the second substrate. The light exit control layer is configured to control a state of exit light of each sub-pixel region. The first substrate includes a first base and a dimming component disposed on a side of the first base. The dimming component includes a plurality of dimming lenses. Each dimming lens is configured to transmit exit light of one sub-pixel region to human eyes and focus the exit light on a corresponding focal plane. The plurality of dimming lenses are configured to focus exit light of the at least two display unit groups on different focal planes. The focal planes are located at a side of the transparent display panel away from the human eyes.

In some embodiments, the dimming lens includes a metasurface lens. The metasurface lens includes a transparent base material and a plurality of microstructures. The plurality of microstructures are disposed on a surface of the transparent base material proximate to the first base. Or the plurality of microstructures are disposed on a surface of the transparent base material away from the first base.

In some embodiments, the plurality of microstructures are arranged into a plurality of loop-shaped structures. Central axes of the plurality of loop-shaped structures substantially coincide, and the plurality of loop-shaped structures are sequentially sleeved in a direction from a center of the transparent base material to an edge of the transparent base material.

In some embodiments, an orthogonal projection of each of the plurality of loop-shaped structures on the transparent base material is substantially in a shape of a rectangle.

In some embodiments, a ratio of a dimension of the rectangle in a length direction to a dimension of the rectangle in a width direction is approximately equal to a ratio of a dimension of a corresponding sub-pixel region in the length direction to a dimension of the corresponding sub-pixel region in the width direction.

In some embodiments, the central axes of the plurality of loop-shaped structures substantially coincide with a central axis of a corresponding sub-pixel region, and/or an edge of an orthogonal projection of the metasurface lens on the first base is substantially overlapped with an edge of an orthogonal projection of a corresponding sub-pixel region on the first base.

In some embodiments, a maximum dimension of each of the plurality of microstructures in a direction perpendicular to the transparent base material is less than or equal to 1 μm.

In some embodiments, the metasurface lens is a transmission phase metasurface lens.

In some embodiments, the plurality of microstructures in the transmission phase metasurface lens include a plurality of cylinders. Axes of the plurality of cylinders are substantially perpendicular to the transparent base material. Dimensions of the plurality of cylinders in respective axis directions are approximately equal, and a diameter of each of the plurality of cylinders is proportional to a phase change amount of light passing through the transmission phase metasurface lens.

In some embodiments, the plurality of microstructures in the transmission phase metasurface lens include a plurality of cylindrical holes. Axes of the plurality of cylindrical holes are substantially perpendicular to the transparent base material. Dimensions of the plurality of cylindrical holes in respective axis directions are approximately equal, and a diameter of each of the plurality of cylindrical holes is proportional to a phase change amount of light passing through the transmission phase metasurface lens.

In some embodiments, the metasurface lens is a geometric phase metasurface lens. The plurality of microstructures in the geometric phase metasurface lens include a plurality of rectangular prisms. Axes of the plurality of rectangular prisms are substantially perpendicular to the transparent base material. Sizes of the plurality of rectangular prisms are approximately equal, and a rotation angle of each of the plurality of rectangular prisms is proportional to a phase change amount of light passing through the geometric phase metasurface lens.

In some embodiments, the transparent display panel further includes a polarizer disposed between the geometric phase metasurface lens and the light exit control layer. The polarizer is configured to convert light entering the geometric phase metasurface lens from the light exit control layer from linearly polarized light to circularly polarized light.

In some embodiments, a phase D of light at each light exit position of the metasurface lens satisfies a following formula:

$$\Phi = \frac{2\pi}{\lambda} \times \left( f - \sqrt{(y+a)^2 + (x+b)^2 + f^2} \right).$$

Here, y is a vertical distance from the light exit position of the metasurface lens to a first plane, x is a vertical distance from the light exit position of the metasurface lens to a second plane, a is a vertical distance from a focus of the metasurface lens to the first plane, b is a vertical distance from the focus of the metasurface lens to the second plane, and f is a focal length of the metasurface lens. The first plane and the second plane are perpendicular to each other, and an intersection line of the first plane and the second plane is a central axis of the metasurface lens.

In some embodiments, the transparent base material is replaced with the first base. The plurality of microstructures are disposed on a surface of the first base proximate to the light exit control layer. Or the plurality of microstructures are disposed on a surface of the first base away from the light exit control layer.

In some embodiments, the light exit control layer includes liquid crystals and an electrode layer. The electrode layer is configured to drive the liquid crystals under an action of an electric field, so as to control the state of exit light of each sub-pixel region.

In some embodiments, the second substrate is a waveguide layer. A refractive index of the waveguide layer is greater than an ordinary light refractive index of the liquid crystals, and the refractive index of the waveguide layer is less than or equal to an extraordinary light refractive index of the liquid crystals.

In another aspect, a display device is provided. The display device includes the transparent display panel according to any one of the above embodiments, and at least one side-type collimated light source disposed at at least one side of the second substrate in the transparent display panel.

In yet another aspect, glasses are provided. The glasses include a support structure and at least one transparent display panel according to any one of the above embodiments installed on the support structure.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal involved in the embodiments of the present disclosure.

DETAILED DESCRIPTION

Figure 1:
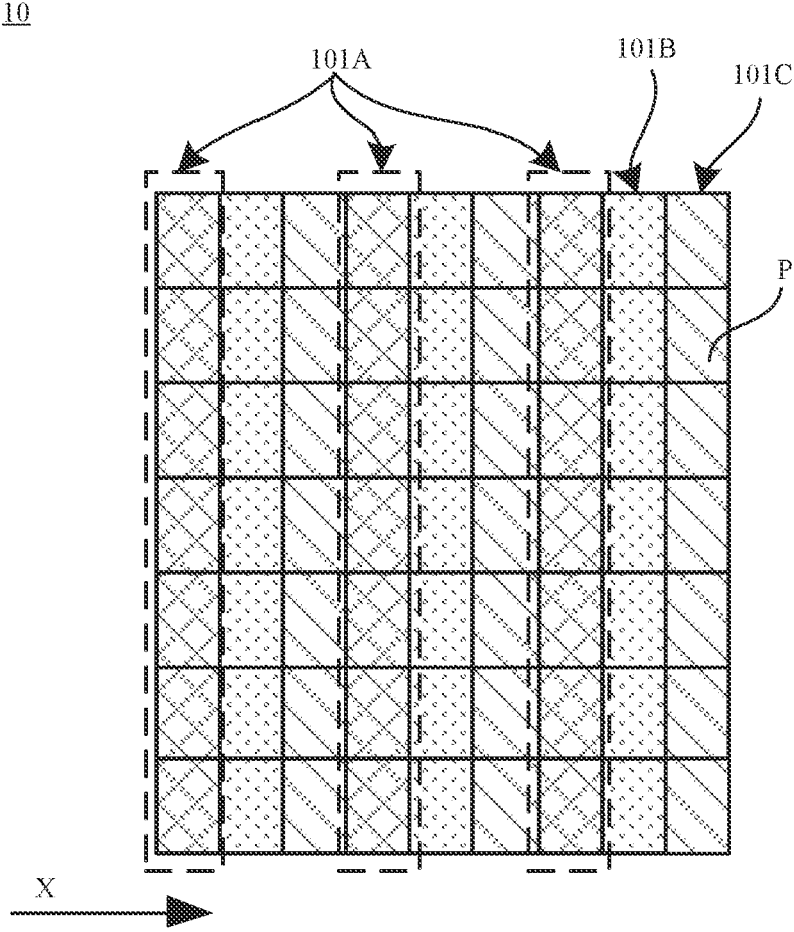
FIG. 1 is a structural diagram of a plurality of sub-pixel regions in a transparent display panel, in accordance with some embodiments of the present disclosure.

Technical solutions in some embodiments of the present disclosure will be described clearly and completely with reference to the accompanying drawings. Obviously, the described embodiments are merely some but not all embodiments of the present disclosure. All other embodiments obtained by a person of ordinary skill in the art on a basis of the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "an example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first", "second" and "third" are only used for descriptive purposes, and are not to be construed as indicating or implying the relative importance or implicitly indicating to the number of indicated technical features. Thus, a feature defined with "first", "second" or "third" may explicitly or implicitly include one or more of the features. In the description of the embodiments of the present disclosure, the term "a plurality of/the plurality of" means two or more unless otherwise specified.

In the description of some embodiments, the terms "coupled" and "connected" and their extensions may be used. For example, the term "connected" may be used in the description of some embodiments to indicate that two or more components are in direct physical contact or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The term "about" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

AR glasses include two transparent display panels respectively corresponding to the left eye and the right eye of a person. Each transparent display panel may generate a virtual image, and superimpose the virtual image onto a real environment observed by the human eye through the transparent display panel, thereby realizing an augmented reality display function.

In the related art, the transparent display panel includes a grating. Exit light of a plurality of sub-pixel regions in the transparent display panel are diffracted by the grating, and then enters human eyes, thereby realizing a function of displaying a stereoscopic virtual image. However, in the related art, an efficiency and an angle of the exit light are affected by the grating diffraction, which results in a low light extraction efficiency, a poor transparency, and a small angle of field of view of the transparent display panel.

Figure 2:
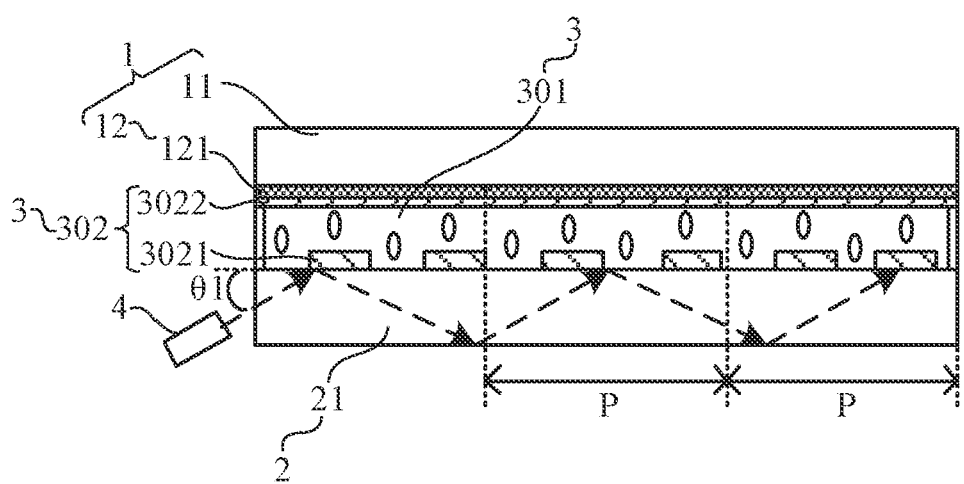
FIG. 2 is a structural diagram of a transparent display panel, in accordance with some embodiments of the present disclosure.

Based on this, referring to FIGS. 1 and 2, in some embodiments of the present disclosure, a transparent display panel 10 is provided. The transparent display panel 10 may be applied to a display device. The display device may be any product or component with a display function such as an AR helmet, AR glasses, a mobile phone, a tablet computer, a television, a display, a notebook computer, a digital photo frame, or a navigator.

The transparent display panel 10 has a plurality of sub-pixel regions P, and the plurality of sub-pixel regions P are divided into at least two display unit groups. For example, as shown in FIG. 1, the plurality of sub-pixel regions P in the transparent display panel 10 are divided into a first display unit group 101A, a second display unit group 101B, and a third display unit group 101C. Sub-pixel regions P in each row include sub-pixel regions located in the first display unit group 101A, sub-pixel regions located in the second display unit group 101B, and sub-pixel regions located in the third display unit group 101C, and the sub-pixel regions located in the first display unit group 101A, the sub-pixel regions located in the second display unit group 101B, and the sub-pixel regions located in the third display unit group 101C are sequentially and alternately arranged in a row direction. Here, it will be noted that there are many manners to divide the display unit groups in the transparent display panel 10, as long as exit light of the at least two divided display unit groups may be focused on different focal planes. Therefore, in practical applications, it is not limited to the dividing manner shown in this example.

Referring to FIG. 2, the transparent display panel 10 includes a first substrate 1 and a second substrate 2 assembled with each other, and a light exit control layer 3 arranged between the first substrate 1 and the second substrate 2. The light exit control layer 3 is configured to control a state of exit light of each sub-pixel region P. Here, "controlling the state of exit light of each sub-pixel region P" refers to controlling each sub-pixel region P to emit light towards a side where the first substrate 1 is located, and controlling a gray scale of exit light of each sub-pixel region P. For example, as shown in FIG. 2, the transparent display panel 10 is a liquid crystal display panel. The light exit control layer 3 includes liquid crystals 301 and an electrode layer 302. The electrode layer 302 is configured to drive the liquid crystals 301 under an action of an electric field, so as to control the state of exit light of each sub-pixel region P. It will be noted that the present disclosure does not limit the arrangement of the electrode layer 302. For example, referring to FIG. 2, the electrode layer 302 may include driving electrodes 3021 and a common electrode 3022. The driving electrode 3021 and the common electrode 3022 may be both provided on the first substrate 1 or the second substrate 2, or may be respectively provided on the first substrate 1 and the second substrate 2 as shown in FIG. 2. In addition, the liquid crystal display panel may be an in-plane switching (IPS) liquid crystal display panel, a twisted nematic (TN) liquid crystal display panel, or a fringe field switching (FFS) liquid crystal display panel, which is not limited in the present disclosure.

For example, referring to FIG. 2, the second substrate 2 is a waveguide layer 21. A refractive index of the waveguide layer 21 is greater than an ordinary light refractive index of the liquid crystals 301, and the refractive index of the waveguide layer 21 is less than or equal to an extraordinary light refractive index of the liquid crystals 301. The ordinary light refers to polarized light whose polarization direction is perpendicular to an optical axis of the liquid crystal 301. The extraordinary light refers to polarized light whose polarization direction is parallel to the optical axis of the liquid crystal 301.

In a case where the ordinary light refractive index of the liquid crystal 301 is less than the refractive index of the waveguide layer 21, and exit light of a side-type collimated light source 4 and a surface of the waveguide layer 21 facing the first substrate 1 form an included angle θ1, and a complementary angle of the included angle θ1 is greater than a critical angle of total reflection of light entering the liquid crystal 301 (optically rarer medium) from the waveguide layer 21 (optically denser medium), the exit light of the side-type collimated light source 4 is totally reflected after entering the waveguide layer 21. That is, the light may be reflected back and forth and go forward in the waveguide layer 21 without being transmitted out. The critical angle of total reflection is:

$$\Phi 1 = \arcsin\left(\frac{n1}{n2}\right).$$

Here, n1 is the ordinary light refractive index of the liquid crystal 301, and n2 is the refractive index of the waveguide layer 21. In a case where light enters the optically rarer medium (e.g., the liquid crystal 301) from the optically denser medium (e.g., the waveguide layer 21), and an incident angle is greater than the critical angle of total reflection, the total reflection occurs.

In this case, by applying a voltage to the electrode layer 302 (e.g., the driving electrodes 3021 and the common electrode 3022), the liquid crystal 301 in the sub-pixel region P may be driven to deflect under the action of the electric field, and thus the ordinary light refractive index n1 of the liquid crystal 301 in this sub-pixel region P may be changed to break a total reflection state, so as to make this sub-pixel region P emit light. In addition, by adjusting a magnitude of the voltage applied to the electrode layer 302, a deflection angle of the liquid crystal 301 in each sub-pixel region P may be adjusted, and thus the ordinary light refractive index of the liquid crystal 301 in each sub-pixel region P may be adjusted, so that the sub-pixel regions P generate different gray scales for display. For example, the gray scale may be within a range of 0 to 255, and an adjustment of 256 gray scale levels may be realized by gradually adjusting the applied voltage. In a case where the gray scale of the sub-pixel region P is 0, in this sub-pixel region, light does not enter the liquid crystal 301 from the waveguide layer 21, and this sub-pixel region is in a dark state. In a case where the gray scale is 255, in this sub-pixel region, almost all light enters the liquid crystal 301 from the waveguide layer 21, and this sub-pixel region is in a bright state.

The side-type collimated light source 4 may emit three primary colors of light in a time sequence, for example, red light, green light, and blue light. During display, for each display unit group, one pixel region may be formed of three sub-pixel regions P among them. The light exit control layer controls colors of exit light of the three sub-pixel regions P to be red, green, and blue, and controls the display gray scales of the three sub-pixel regions P, so as to realize display control of the pixel regions, thereby realizing color display.

Figure 3:
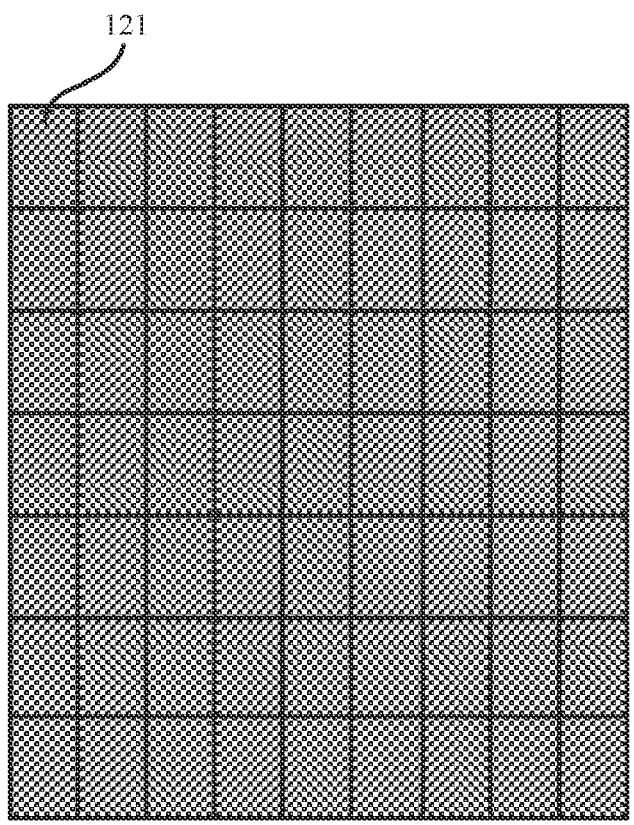
FIG. 3 is a structural diagram of a dimming component, in accordance with some embodiments of the present disclosure.
Figure 4:
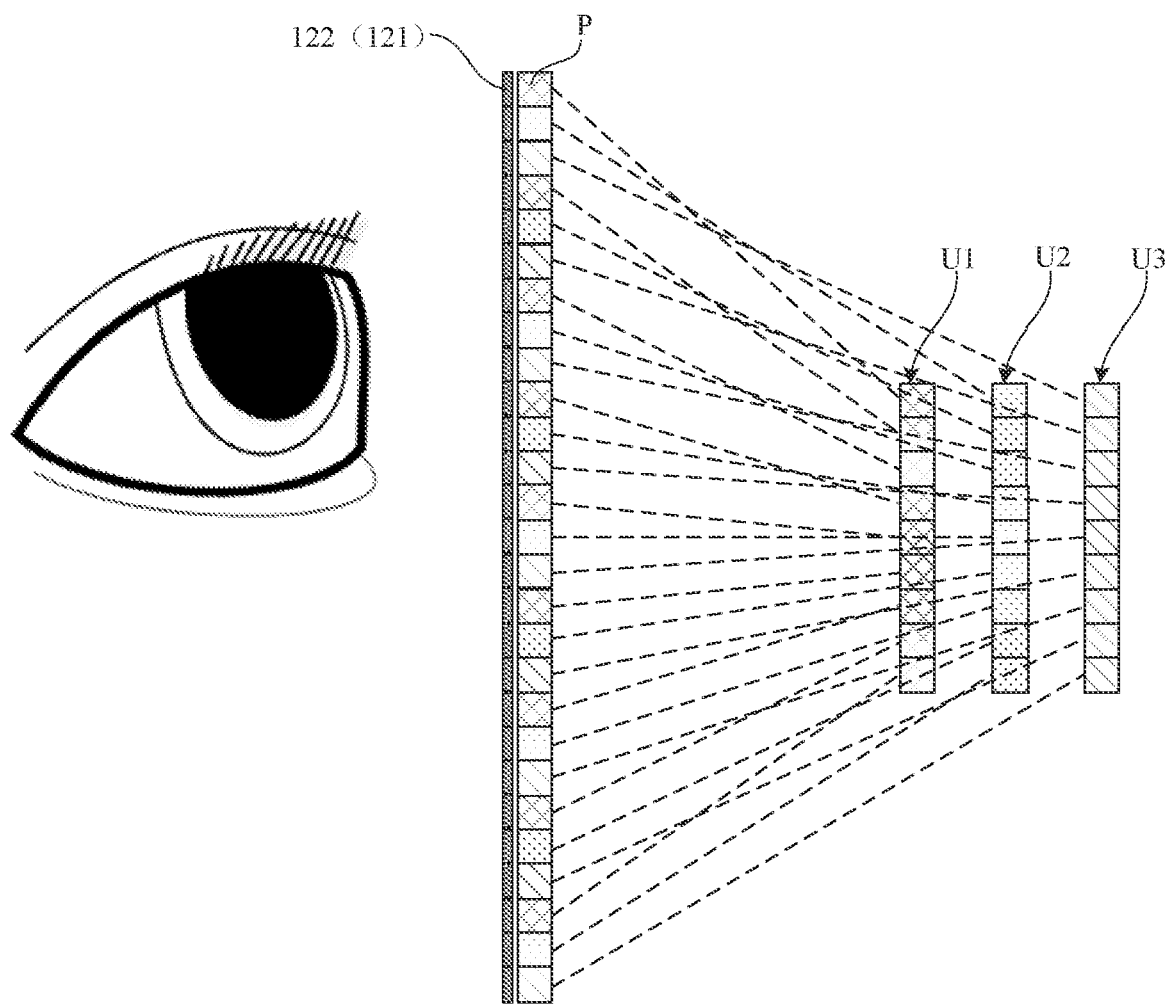
FIG. 4 is an optical path diagram of a transparent display panel, in accordance with some embodiments of the present disclosure.

Referring to FIGS. 2 to 4, the first substrate 1 includes a first base 11 and a dimming component 12. The dimming component 12 is disposed on a side of the first base 11. The dimming component 12 includes a plurality of dimming lenses 121. Each dimming lens 121 is configured to transmit exit light of one sub-pixel region P to the human eyes and focus the exit light on a corresponding focal plane. The plurality of dimming lenses 121 are configured to focus exit light of the at least two display unit groups on different focal planes (a first focal plane U1, a second focal plane U2, and a third focal plane U3 as shown in FIG. 4). The focal planes are located at a side of the transparent display panel away from the human eyes.

In some embodiments of the present disclosure, the dimming component 12 is provided, the dimming component 12 includes the plurality of dimming lenses 121, and the plurality of dimming lenses 121 focus the exit light of the at least two display unit groups on different focal planes, thereby realizing multi-focal plane display. Moreover, the plurality of dimming lenses 121 in this embodiment do not block light, so that the light extraction efficiency and the transparency of the transparent display panel 10 are high, and mixed display effects of a virtual image and a real scene is improved.

For example, referring to FIG. 4, the dimming lens 121 is a metasurface lens 122, and each metasurface lens 122 may focus exit light of a corresponding sub-pixel region P at a specified position of a specified focal plane. For example, in FIG. 4, exit light of a first sub-pixel region P, a fourth sub-pixel region P, a seventh sub-pixel region P, a tenth sub-pixel region P, a thirteenth sub-pixel region P, a sixteenth sub-pixel region P, a nineteenth sub-pixel region P, a twenty-second sub-pixel region P, and a twenty-fifth sub-pixel region P counted from top to bottom are focused on the first focal plane U1, and are sequentially arranged from top to bottom. Exit light of a second sub-pixel region P, a fifth sub-pixel region P, an eighth sub-pixel region P, an eleventh sub-pixel region P, a fourteenth sub-pixel region P, a seventeenth sub-pixel region P, a twentieth sub-pixel region P, a twenty-third sub-pixel region P, and a twenty-sixth sub-pixel region P are focused on the second focal plane U2, and are sequentially arranged from top to bottom. Exit light of a third sub-pixel region P, a sixth sub-pixel region P, a ninth sub-pixel region P, a twelfth sub-pixel region P, a fifteenth sub-pixel region P, an eighteenth sub-pixel region P, a twenty-first sub-pixel region P, a twenty-fourth sub-pixel region P, and a twenty-seventh sub-pixel region P are focused on the third focal plane U3, and are sequentially arranged from top to bottom. For the first sub-pixel region P, the specified position of the specified focal plane is an uppermost imaging position of the first focal plane U1 in FIG. 4. For the second sub-pixel region P, the specified position of the specified focal plane is an uppermost imaging position of the second focal plane U2 in FIG. 4. For the third sub-pixel region P, the specified position of the specified focal plane is an uppermost imaging position of the third focal plane U3 in FIG. 4.

Here, orientations indicated as "top" and "bottom" are merely for convenience of describing the present disclosure and for simplifying the description, rather than indicating or implying that the plurality of sub-pixel regions P referred to must have a specific orientation, be constructed and operated in a specific orientation, and thus should not be construed as limiting the present disclosure.

Figure 5A:
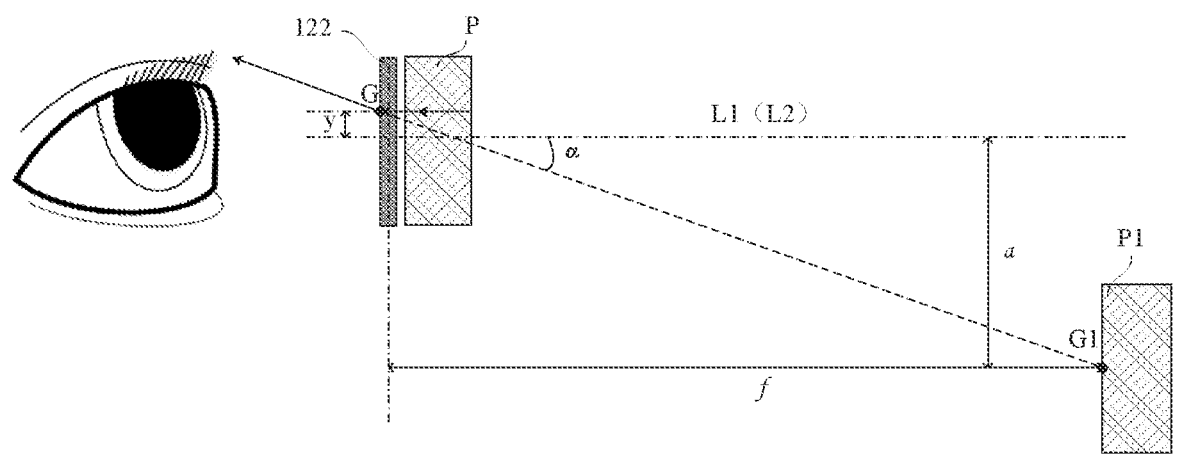
FIG. 5A is an optical path diagram of a metasurface lens, in accordance with some embodiments of the present disclosure.
Figure 5B:
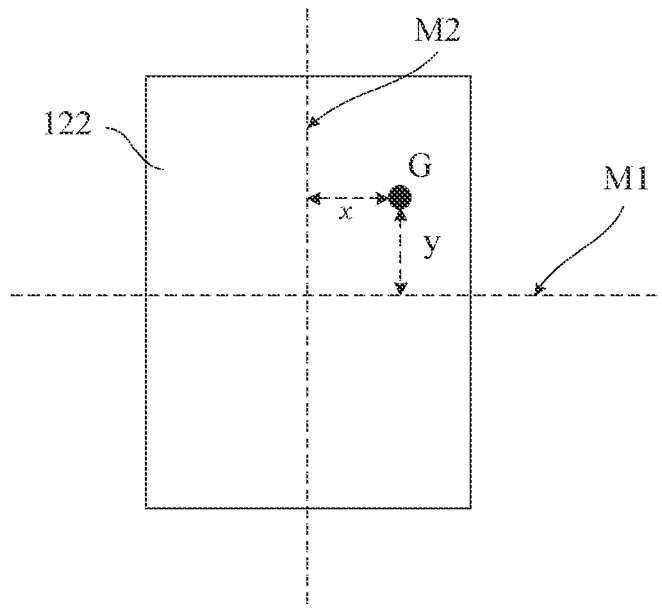
FIG. 5B is a diagram showing positional relationships between a light exit position of a metasurface lens and both first and second planes, in accordance with some embodiments of the present disclosure.
Figure 5C:
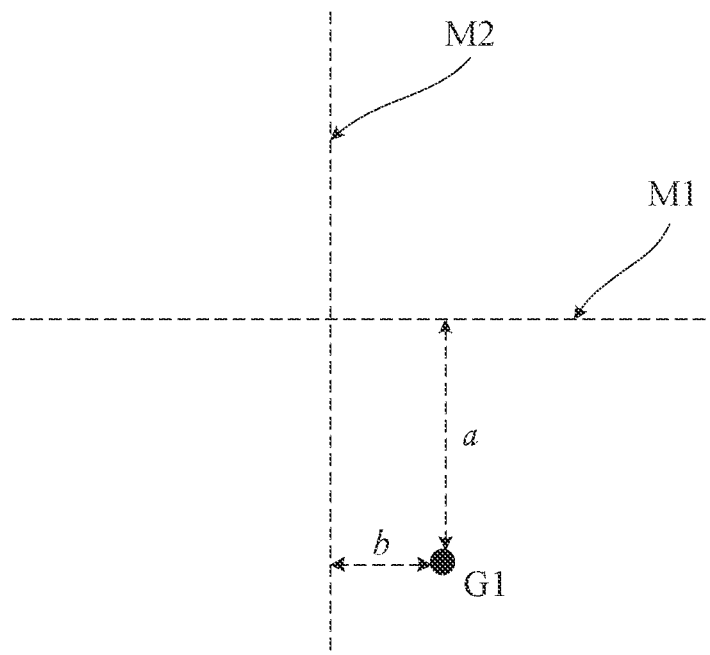
FIG. 5C is a diagram showing positional relationships between a focus of a metasurface lens and both the first and second planes, in accordance with some embodiments of the present disclosure.

Referring to FIGS. 5A to 5C, a phase D of light at each light exit position G of the metasurface lens 122 satisfies a following formula:

$$\Phi = \frac{2\pi}{\lambda} \times \left( f - \sqrt{(y+a)^2 + (x+b)^2 + f^2} \right).$$

Here, y is a vertical distance from the light exit position G of the metasurface lens 122 to a first plane M1, x is a vertical distance from the light exit position G of the metasurface lens to a second plane M2, a is a vertical distance from a focus G1 of the metasurface lens to the first plane M1, b is a vertical distance from the focus G1 of the metasurface lens to the second plane M2, f is a focal length of the metasurface lens 122. The first plane M1 and the second plane M2 are perpendicular to each other, and an intersection line of the first plane M1 and the second plane M2 is a central axis L1 of the metasurface lens (the central axis L1 refers to an axis perpendicular to the metasurface lens).

In some embodiments of the present disclosure, the phase Φ of light at each light exit position G of the metasurface lens 122 may be determined according to an imaging relationship between the sub-pixel region P and a virtual image region P1 in combination with the above formula. Then, according to the phase D of light at each light exit position G and a phase when the light is incident, a phase change amount during the light passing through the metasurface lens 122 is determined. A corresponding structure at each light exit position G of the metasurface lens 122 is designed by the phase change amount, so that the sub-pixel region P is imaged at a corresponding virtual image region P1.

It will be noted that the structure at each light exit position G of the metasurface lens 122 may be designed according to the phase change amount, so that an off-axis angle (an angle between the light and the central axis L1) α of light may be up to about ±60°, e.g., within a range of −65° to +65°. Therefore, the metasurface lenses 122 have a good off-axis imaging characteristic, and may image all sub-pixel regions in the transparent display panel at the specified positions of the specified focal planes in one-to-one correspondence, so that imagings of the display unit groups are spliced into one display image plane on the focal planes, thereby realizing the multi-focal plane display. Moreover, since the off-axis angle of light is large, the angle of field of view of the transparent display panel is accordingly increased. In addition, due to a large distance from the virtual image region P1 to the transparent display panel and a small distance from the human eyes to the transparent display panel, a beam received by the human eyes is substantially a parallel beam. Thereafter, the human eyes trace in reverse to see imaging light spots. That is, the human eyes observe images displayed on the focal planes. Through superimposition of a plurality of focal planes, an imaging depth of field is increased, and more spatial perceptions are sensed in vision, and thus a better stereoscopic display is achieved.

There are various ways to configure a structure of the metasurface lens 122, and the present disclosure includes, but is not limited to, some embodiments shown below.

Figure 6:
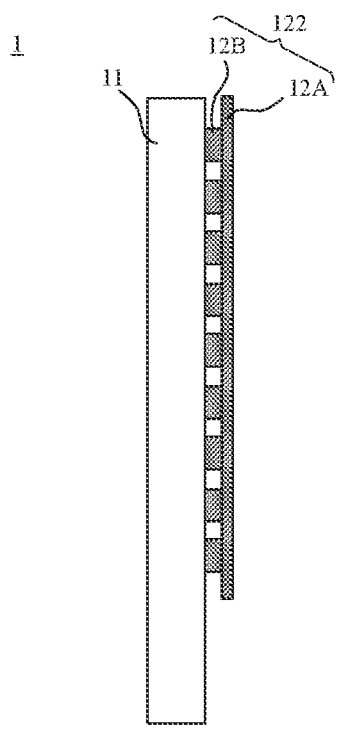
FIG. 6 is a structural diagram of a first substrate, in accordance with some embodiments of the present disclosure.
Figure 7:
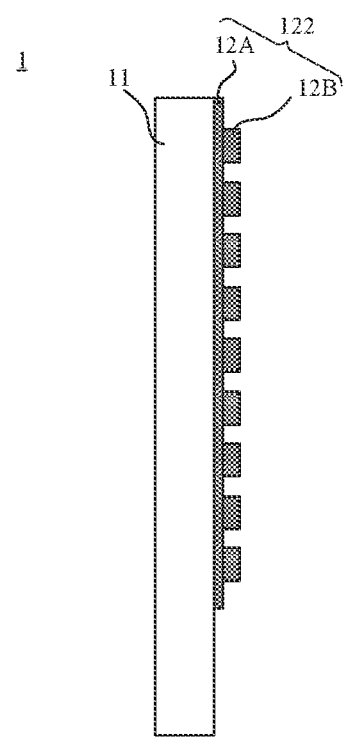
FIG. 7 is a structural diagram of another first substrate, in accordance with some embodiments of the present disclosure.

Referring to FIGS. 6 and 7, in some embodiments, the metasurface lens 122 includes a transparent base material 12A and a plurality of microstructures 12B. As shown in FIG. 6, the plurality of microstructures 12B may be disposed on a surface of the transparent base material 12A proximate to the first base 11. Or, as shown in FIG. 7, the plurality of microstructures 12B may be disposed on a surface of the transparent base material 12A away from the first base 11.

It will be noted that when manufacturing the first substrate 1, the manufactured metasurface lens 122 may be assembled on the first base 11.

Figure 8:
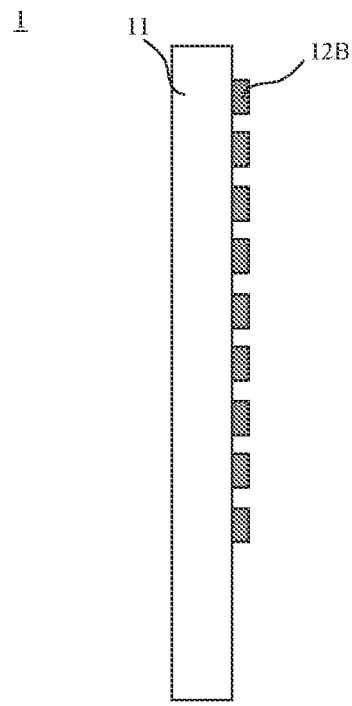
FIG. 8 is a structural diagram of yet another first substrate, in accordance with some embodiments of the present disclosure.

Or, referring to FIG. 8, it is also possible to use the first base 11 to replace the transparent base material 12A, and the plurality of microstructures 12B are directly manufactured on the first base 11. In this case, the plurality of microstructures 12B are disposed on a surface of the first base 11 proximate to the light exit control layer. Or the plurality of microstructures 12B are disposed on a surface of the first base 11 away from the light exit control layer. In this design, since there is no need to provide the transparent base material 12A, an entire thickness of the transparent display panel may be made lighter and thinner.

A maximum dimension of the microstructure 12B in a direction perpendicular to the transparent base material 12A is less than or equal to 1 μm. For example, a dimension of the microstructure 12B in the direction perpendicular to the transparent base material 12A may be 500 nm. Compared with an ordinary lens (a thickness of the ordinary lens is about 40 μm), a thickness of the metasurface lens 122 in the direction perpendicular to the transparent base material 12A is smaller.

For example, the microstructure 12B includes a high refractive index material such as silicon nitride and gallium nitride. The transparent base material 12A may be made of a glass material or a high refractive index material. In a manufacturing process, the plurality of microstructures 12B may be manufactured on the surface of the transparent base material 12A through an electron beam exposure process.

Figure 9A:
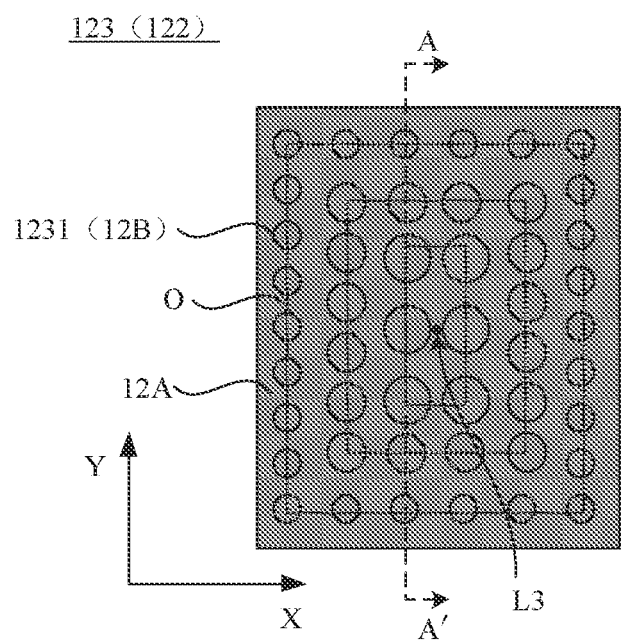
FIG. 9A is a structural diagram of a transmission phase metasurface lens, in accordance with some embodiments of the present disclosure.
Figure 10A:
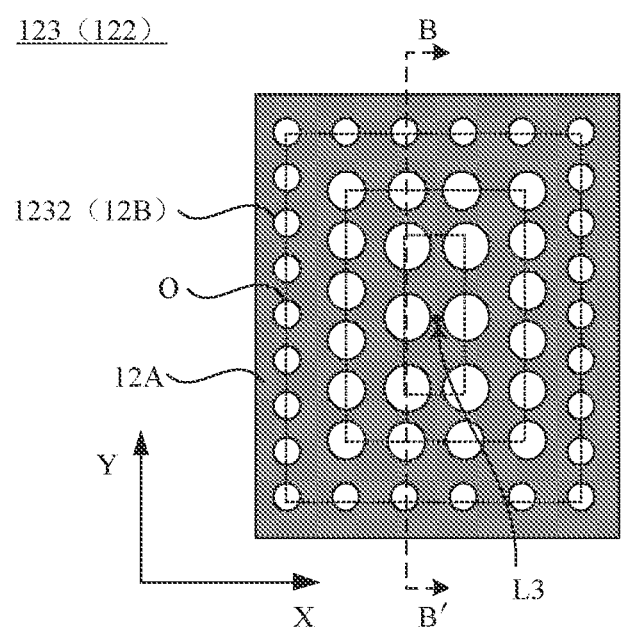
FIG. 10A is a structural diagram of another transmission phase metasurface lens, in accordance with some embodiments of the present disclosure.
Figure 11A:
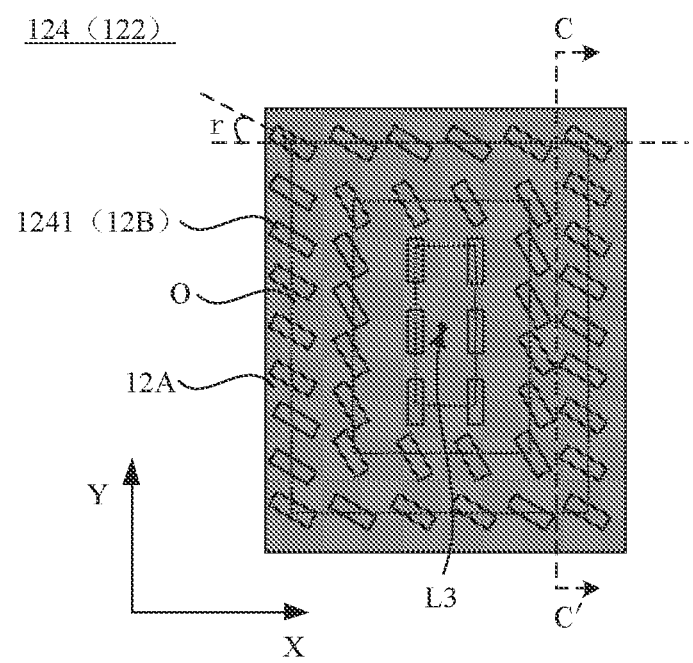
FIG. 11A is a structural diagram of a geometric phase metasurface lens, in accordance with some embodiments of the present disclosure.

In some embodiments, as shown in FIGS. 9A, 10A, and 11A, the plurality of microstructures 12B in the metasurface lens 122 are arranged into a plurality of loop-shaped structures O. Central axes of the plurality of loop-shaped structures O substantially coincide, and the plurality of loop-shaped structures O are sequentially sleeved in a direction from a center of the transparent base material 12A to an edge of the transparent base material 12A. Here, "substantially coincidence" means that among the central axes of the plurality of loop-shaped structures O, an included angle between orthogonal projections of any two central axes on a horizontal plane (i.e., a plane parallel to the first plane M1) is less than 10 degrees. In this design, the imaging light spots of the sub-pixel regions may be more uniform, which is beneficial to improve a resolution of a displayed image.

On this basis, for example, as shown in FIGS. 9A, 10A, and 11A, an orthogonal projection of each loop-shaped structure O on the transparent base material 12A is substantially in a shape of a rectangle. Here, "substantially in the shape of the rectangle" may be in a shape of a standard rectangular frame, or may be in a shape of an approximately standard rectangular frame enclosed by a plurality of projection points (for example, an orthogonal projection of each microstructure 12B on the transparent base material 12A is a projection point) that are sequentially arranged at intervals, and may further be in a shape of an approximately standard rectangular frame in which an included angle between adjacent sides is approximately a right angle (e.g., the included angle between adjacent sides is within a range of 85° to 95°) and/or each side is approximately a straight side (for example, a vertical distance from each point on any side to a line connecting two end points of the side does not exceed 2 μm). In this design, the imaging light spots of the sub-pixel regions may be substantially in a rectangular shape, which is beneficial to improve splicing display effects (i.e., display effects of the images on the focal planes) of the imaging light spots of all sub-pixel regions in the display unit groups.

For example, referring to FIGS. 9A, 10A, and 11A, a ratio of a dimension of the rectangle in a length direction Y to a dimension of the rectangle in a width direction X is approximately equal to a ratio of a dimension of a corresponding sub-pixel region in the length direction Y to a dimension of the corresponding sub-pixel region in the width direction X. Here, "approximately equal to" may mean that a difference value between two ratios does not exceed 0.1 times any one of the ratios. In this design, the imaging light spots of the sub-pixel regions may be in a uniform rectangular shape, and a seamless splice may be almost realized, thereby significantly improving the resolution of the displayed image.

For example, referring to FIGS. 9A, 10A, 11A and 5A, the central axes L3 of the plurality of loop-shaped structures substantially coincide with a central axis L2 of the corresponding sub-pixel region P. Here, "substantially coincidence" means that an included angle between orthogonal projections of any two central axes on the horizontal plane is less than 10°. In this design, each metasurface lens 122 may uniformly modulate exit light of a corresponding sub-pixel region P, so as to enable the exit light of each sub-pixel region to be uniformly focused at the specified position of the specified focal plane.

For example, referring to FIG. 5A, an edge of an orthogonal projection of the metasurface lens 122 on the first base is substantially overlapped with an edge of an orthogonal projection of the corresponding sub-pixel region P on the first base (in this case, the central axis L1 of the metasurface lens 122 substantially coincides with the central axis L2 of the corresponding sub-pixel region P). Here, "substantially overlap" means that a maximum interval between the edges of the two orthogonal projections does not exceed 2 μm, and "substantially coincidence" means that an included angle between the orthogonal projections of the two central axes on the horizontal plane is less than 10°. In this design, each metasurface lens 122 may effectively modulate exit light of a corresponding sub-pixel region P, so as to enable the exit light of each sub-pixel region to be focused at the specified position of the specified focal plane.

For example, an aperture of each metasurface lens 122 is less than 20 μm, and in this design, a color difference may be effectively reduced, thereby improving display effects of the transparent display panel.

In some embodiments, referring to FIGS. 9A, 9B, 10A, and 10B, the metasurface lens 122 is a transmission phase metasurface lens 123.

Figure 9B:
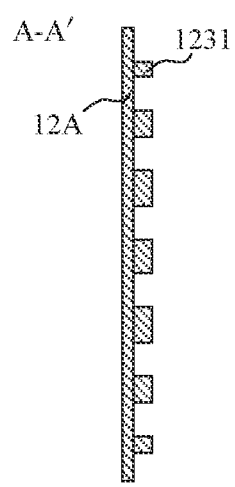
FIG. 9B is a sectional view of the transmission phase metasurface lens in FIG. 9A taken along the A-A' direction.

For example, as shown in FIGS. 9A and 9B, the plurality of microstructures 12B in the transmission phase metasurface lens 123 include a plurality of cylinders 1231. Axes of the plurality of cylinders 1231 are substantially perpendicular to the transparent base material 12A, and dimensions of the plurality of cylinders 1231 in respective axis directions are approximately equal. Here, "Substantially perpendicular to" may mean that an included angle between the axis of the cylinder 1231 and a vertical line perpendicular to the transparent base material 12A is less than 10°. "Approximately equal" may mean that a difference between the dimensions of any two cylinders 1231 in the respective axis directions does not exceed 2 μm. In this case, a diameter of each of the plurality of cylinders 1231 is proportional to a phase change amount of light passing through the transmission phase metasurface lens 123. That is, each cylinder 1231 in the transmission phase metasurface lens 123 and a portion located on a periphery of the cylinder 1231 are of a periodic structure. The larger the diameter of the cylinder 1231, the greater the phase change amount during light passing through the periodic structure. For example, in the transmission phase metasurface lens 123 shown in FIG. 9A, in a direction from an edge to a center, the diameter of the cylinder 1231 gradually increases, and accordingly, the phase change amount during light passing through a corresponding periodic structure is also increased.

Figure 10B:
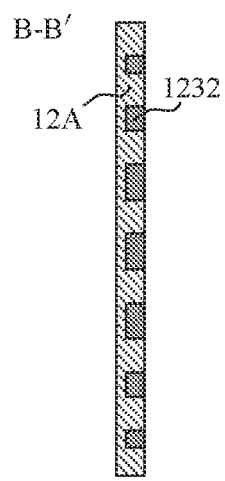
FIG. 10B is a sectional view of the transmission phase metasurface lens in FIG. 10A taken along the B-B' direction.

For another example, as shown in FIGS. 10A and 10B, the plurality of microstructures 12B in the transmission phase metasurface lens 123 include a plurality of cylindrical holes 1232. Axes of the plurality of cylindrical holes 1232 are substantially perpendicular to the transparent base material 12A, and dimensions of the plurality of cylindrical holes 1232 in respective axis directions are approximately equal. Here, "substantially perpendicular to" may mean that an included angle between the axis of the cylindrical hole 1232 and the vertical line perpendicular to the transparent base material 12A is less than 10°. "Approximately equal" may mean that a difference between the dimensions of any two cylindrical holes 1232 in the respective axis directions does not exceed 2 μm. In this case, a diameter of each of the plurality of cylindrical holes 1232 is proportional to a phase change amount of light passing through the transmission phase metasurface lens 123. That is, each cylindrical hole 1232 in the transmission phase metasurface lens 123 and a portion located on a periphery of the cylindrical hole 1232 are of a periodic structure. The larger the diameter of the cylindrical hole 1232, the greater the phase change amount during light passing through the periodic structure. For example, in the transmission phase metasurface lens 123 shown in FIG. 10A, in a direction from an edge to a center, the diameter of the cylindrical hole 1232 gradually increases, and accordingly, the phase change amount during light passing through a corresponding periodic structure is also increased.

Figure 11B:
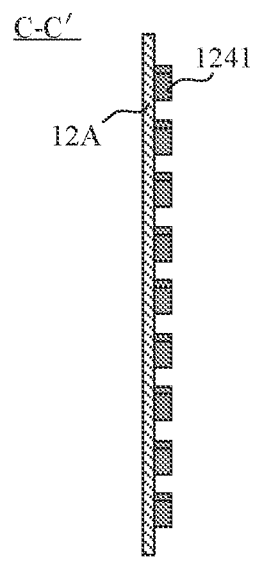
FIG. 11B is a sectional view of the geometric phase metasurface lens in FIG. 11A taken along the C-C' direction.

In some other embodiments, referring to FIGS. 11A and 11B, the metasurface lens 122 is a geometric phase metasurface lens 124. The plurality of microstructures 12B in the geometric phase metasurface lens 124 include a plurality of rectangular prisms 1241. Axes of the plurality of rectangular prisms 1241 are substantially perpendicular to the transparent base material 12A, and sizes of the plurality of rectangular prisms 1241 are approximately equal. Here, "substantially perpendicular to" may mean that an included angle between the axis of the rectangular prism 1241 and the vertical line perpendicular to the transparent base material 12A is less than 10°. "Approximately equal" may mean that a difference between dimensions of any two rectangular prisms 1241 in any same direction does not exceed 2 μm. In this case, a rotation angle r of each of the plurality of rectangular prisms 1241 is proportional to a phase change amount of light passing through the geometric phase metasurface lens 124. That is, each rectangular prism 1241 in the geometric phase metasurface lens 124 and a portion located on a periphery of the rectangular prism 1241 are of a periodic structure. The greater the rotation angle r of the rectangular prism 1241, the greater the phase change amount during light passing through the periodic structure. For example, in the geometric phase metasurface lens 124 shown in FIG. 11A, in a direction from an edge to a center, the rotation angle r of the rectangular prism 1241 gradually increases, and accordingly, the phase change amount during light passing through a corresponding periodic structure is also increased.

For example, the rotation angle r of the rectangular prism 1241 and the phase change amount during the light passing through the corresponding periodic structure have a double relationship, i.e., the phase change amount is 2r.

In a case where the phase change amount is 0, a position at which the rectangular prism 1241 is located is a reference position. That is, the rotation angle r refers to an included angle between the rectangular prism 1241 at a rotated position and the rectangular prism 1241 at the reference position.

Figure 12:
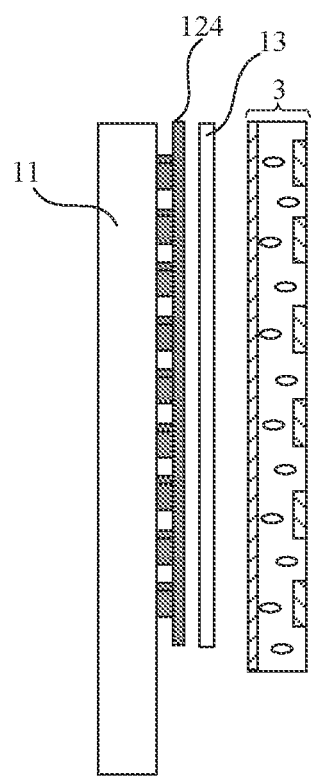
FIG. 12 is a structural diagram of another transparent display panel, in accordance with some embodiments of the present disclosure.

On this basis, for example, referring to FIG. 12, the transparent display panel further includes a polarizer 13. The polarizer 13 is provided between the geometric phase metasurface lens 124 and the light exit control layer 3. The polarizer 13 is configured to convert light entering the geometric phase metasurface lens 124 from the light exit control layer 3 from linearly polarized light to circularly polarized light. In this design, the geometric phase metasurface lens 124 may perform a more accurate modulation on a phase of light passing through the geometric phase metasurface lens 124, thereby improving reliability. It will be noted that a specific position and structure of the polarizer 13 are not limited in this embodiment, as long as it is satisfied that the polarizer 13 may convert the light entering the geometric phase metasurface lens 124 from the light exit control layer 3 from linearly polarized light to circularly polarized light. For example, the polarizer 13 may be provided in a liquid crystal cell (e.g., a box-shaped structure formed by bonding the first substrate and the second substrate together by a frame sealant), or may be provided outside the liquid crystal cell. For another example, the polarizer 13 may be a metal wire grid polarizer (MWGP).

Figure 13:
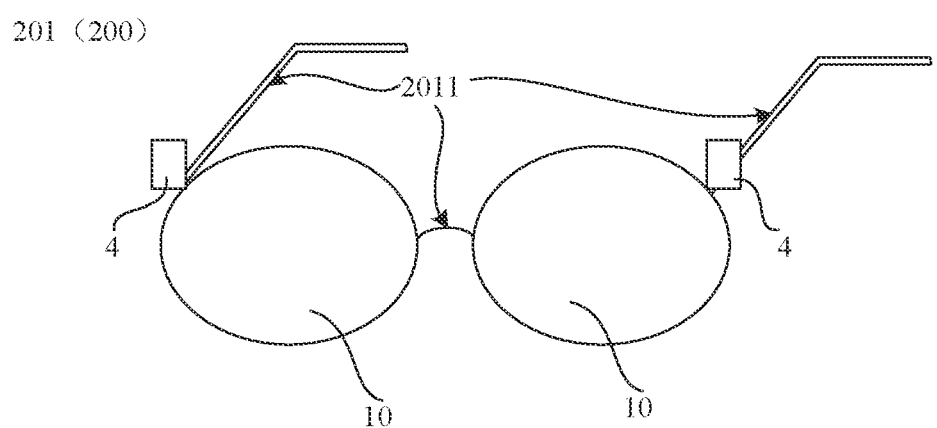
FIG. 13 is a structural diagram of a display device, in accordance with some embodiments of the present disclosure.

In some embodiments of the present disclosure, a display device 200 is provided. Referring to FIG. 13, the display device 200 includes the transparent display panel(s) 10 described in any of the embodiments and side-type collimated light source(s) 4. The side-type collimated light source(s) 4 are provided at at least one side of the second substrate in the transparent display panel 10, and the side-type collimated light source 4 may emit three primary colors of light in a time sequence, for example, red light, green light, and blue light.

The side-type collimated light source 4 in each transparent display panel 10 may be made of semiconductor laser chips with three colors of red (R), green (G) and blue (B) after light mixing, may be made of light-emitting diode chips (LED) with three colors of R, G and B after collimation and light mixing, may be made of a white LED chip after collimation, or may be made of a strip-shaped cold cathode fluorescent lamp (CCFL) and a light collimating structure. The foregoing light source structures are merely examples, and the side-type collimated light source 4 in the embodiments of the present disclosure is not limited to the foregoing structures.

For example, the side-type collimated light source 4 may realize collimation through a reflector, and a collimation degree may be within a range of −3° to +3°. In addition, in order to match a width of the second substrate (e.g., a waveguide layer) in the transparent display panel 10, the side-type collimated light source 4 may further be a laser chip or an LED chip strip with a width consistent with that of the second substrate. Or, a beam expanding structure may further be provided in front of the laser chip or the LED chip trip.

In some embodiments of the present disclosure, since the display device 200 includes the transparent display panel(s) 10 described in any of the embodiments, the display device 200 has all beneficial effects of the transparent display panel 10 as described above, which will not be repeated here.

The display device 200 may be any product or component having a display function such as an AR helmet, AR glasses, a mobile phone, a tablet computer, a television, a display, a notebook computer, a digital photo frame, or a navigator.

In some embodiments of the present disclosure, glasses 201 are further provided, and the glasses 201 may be AR glasses. As shown in FIG. 13, the glasses 201 include a support structure 2011 and at least one transparent display panel 10 disposed on the support structure 2011. For example, the support structure includes two eyeglass frames connected to each other, and two temples respectively connected to the two eyeglass frames. For each eyeglass frame, one transparent display panel 10 is installed therein, and the two transparent display panels 10 correspond to the left eye and the right eye of a person, respectively. Each temple may be put on one ear of a person, so that the two transparent display panels 10 are respectively placed in front of the left eye and the right eye.

In some embodiments of the present disclosure, since the glasses 201 include the transparent display panels 10 described in any of the embodiments, the glasses 201 have all beneficial effects of the transparent display panel 10 as described above, which will not be repeated here.

The foregoing descriptions are merely specific implementation manners of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A transparent display panel having a plurality of sub-pixel regions, the plurality of sub-pixel regions being divided into at least two display unit groups; the transparent display panel comprising:
    a first substrate and a second substrate assembled with each other; and
    a light exit control layer disposed between the first substrate and the second substrate, the light exit control layer being configured to control a state of exit light of each sub-pixel region; wherein
    the first substrate includes:
    a first base; and
    a dimming component disposed on a side of the first base, the dimming component including a plurality of dimming lenses, each dimming lens being configured to transmit exit light of one sub-pixel region to human eyes and focus the exit light on a corresponding focal plane, and
    the plurality of dimming lenses being configured to focus exit light of the at least two display unit groups on different focal planes, wherein the focal planes are located at a side of the transparent display panel away from the human eyes; wherein
    the dimming lens includes a metasurface lens; the metasurface lens includes: a transparent base material; and a plurality of microstructures disposed on a surface of the transparent base material proximate to the first base, or disposed on a surface of the transparent base material away from the first base;
    the plurality of microstructures are arranged into a plurality of loop-shaped structures, central axes of the plurality of loop-shaped structures substantially coincide, and the plurality of loop-shaped structures are sequentially sleeved in a direction from a center of the transparent base material to an edge of the transparent base material;
    an orthogonal projection of each of the plurality of loop-shaped structures on the transparent base material is substantially in a shape of a rectangle;
    the metasurface lens is a transmission phase metasurface lens;
    the plurality of microstructures in the transmission phase metasurface lens include a plurality of cylindrical holes, and axes of the plurality of cylindrical holes are substantially perpendicular to the transparent base material;
    dimensions of the plurality of cylindrical holes in respective axis directions are approximately equal, and a diameter of each of the plurality of cylindrical holes is proportional to a phase change amount of light passing through the transmission phase metasurface lens; and
    each of the plurality of loop-shaped structures includes multiple cylindrical holes, and diameters of the multiple cylindrical holes are equal.

2. The transparent display panel according to claim 1, wherein a ratio of a dimension of the rectangle in a length direction to a dimension of the rectangle in a width direction is approximately equal to a ratio of a dimension of a corresponding sub-pixel region in the length direction to a dimension of the corresponding sub-pixel region in the width direction.

3. The transparent display panel according to claim 1, wherein the central axes of the plurality of loop-shaped structures substantially coincide with a central axis of a corresponding sub-pixel region; and/or
    an edge of an orthogonal projection of the metasurface lens on the first base is substantially overlapped with an edge of an orthogonal projection of a corresponding sub-pixel region on the first base.

4. The transparent display panel according to claim 1, wherein a maximum dimension of each of the plurality of microstructures in a direction perpendicular to the transparent base material is less than or equal to 1 μm.

5. The transparent display panel according to claim 1, wherein a phase Φ of light at each light exit position of the metasurface lens satisfies a following formula:

$$\Phi = \frac{2\pi}{\lambda} \times \left( f - \sqrt{(y+a)^2 + (x+b)^2 + f^2} \right);$$

wherein y is a vertical distance from the light exit position of the metasurface lens to a first plane, x is a vertical distance from the light exit position of the metasurface lens to a second plane, a is a vertical distance from a focus of the metasurface lens to the first plane, b is a vertical distance from the focus of the metasurface lens to the second plane, and f is a focal length of the metasurface lens; the first plane and the second plane are perpendicular to each other, and an intersection line of the first plane and the second plane is a central axis of the metasurface lens.

6. The transparent display panel according to claim 1, wherein the transparent base material is replaced with the first base;
    the plurality of microstructures are disposed on a surface of the first base proximate to the light exit control layer, or the plurality of microstructures are disposed on a surface of the first base away from the light exit control layer.

7. The transparent display panel according to claim 1, wherein the light exit control layer includes:
    liquid crystals; and
    an electrode layer configured to drive the liquid crystals under an action of an electric field, so as to control the state of exit light of each sub-pixel region.

8. The transparent display panel according to claim 7, wherein the second substrate is a waveguide layer, a refractive index of the waveguide layer is greater than an ordinary light refractive index of the liquid crystals, and the refractive index of the waveguide layer is less than or equal to an extraordinary light refractive index of the liquid crystals.

9. A display device, comprising:
the transparent display panel according to claim 1; and
at least one side-type collimated light source disposed at at least one side of the second substrate in the transparent display panel.

10. Glasses, comprising:
a support structure; and
at least one transparent display panel according to claim 1 installed on the support structure.

11. A transparent display panel having a plurality of sub-pixel regions, the plurality of sub-pixel regions being divided into at least two display unit groups; the transparent display panel comprising:
    a first substrate and a second substrate assembled with each other; and
    a light exit control layer disposed between the first substrate and the second substrate, the light exit control layer being configured to control a state of exit light of each sub-pixel region; wherein
the first substrate includes:
a first base; and
a dimming component disposed on a side of the first base, the dimming component including a plurality of dimming lenses, each dimming lens being configured to transmit exit light of one sub-pixel region to human eyes and focus the exit light on a corresponding focal plane, and
the plurality of dimming lenses being configured to focus exit light of the at least two display unit groups on different focal planes, wherein the focal planes are located at a side of the transparent display panel away from the human eyes; wherein
the dimming lens includes a metasurface lens; the metasurface lens includes: a transparent base material; and a plurality of microstructures disposed on a surface of the transparent base material proximate to the first base, or disposed on a surface of the transparent base material away from the first base;
the plurality of microstructures are arranged into a plurality of loop-shaped structures, central axes of the plurality of loop-shaped structures substantially coincide, and the plurality of loop-shaped structures are sequentially sleeved in a direction from a center of the transparent base material to an edge of the transparent base material;
an orthogonal projection of each of the plurality of loop-shaped structures on the transparent base material is substantially in a shape of a rectangle;
the metasurface lens is a transmission phase metasurface lens;
the plurality of microstructures in the transmission phase metasurface lens include a plurality of cylinders, and axes of the plurality of cylinders are substantially perpendicular to the transparent base material;
dimensions of the plurality of cylinders in respective axis directions are approximately equal, and a diameter of each of the plurality of cylinders is proportional to a phase change amount of light passing through the transmission phase metasurface lens; and
each of the plurality of loop-shaped structures includes multiple cylinders, and diameters of the multiple cylinders are equal.

12. A display device, comprising:
the transparent display panel according to claim 11; and
at least one side-type collimated light source disposed at at least one side of the second substrate in the transparent display panel.

13. Glasses, comprising:
a support structure; and
at least one transparent display panel according to claim 11 installed on the support structure.

14. A transparent display panel having a plurality of sub-pixel regions, the plurality of sub-pixel regions being divided into at least two display unit groups; the transparent display panel comprising:
    a first substrate and a second substrate assembled with each other; and
    a light exit control layer disposed between the first substrate and the second substrate, the light exit control layer being configured to control a state of exit light of each sub-pixel region; wherein
the first substrate includes:

a first base; and a dimming component disposed on a side of the first base, the dimming component including a plurality of dimming lenses, each dimming lens being configured to transmit exit light of one sub-pixel region to human eyes and focus the exit light on a corresponding focal plane, and the plurality of dimming lenses being configured to focus exit light of the at least two display unit groups on different focal planes, wherein the focal planes are located at a side of the transparent display panel away from the human eyes; wherein the dimming lens includes a metasurface lens; the metasurface lens includes: a transparent base material; and a plurality of microstructures disposed on a surface of the transparent base material proximate to the first base, or disposed on a surface of the transparent base material away from the first base;

the plurality of microstructures are arranged into a plurality of loop-shaped structures, central axes of the plurality of loop-shaped structures substantially coincide, and the plurality of loop-shaped structures are sequentially sleeved in a direction from a center of the transparent base material to an edge of the transparent base material;

an orthogonal projection of each of the plurality of loop-shaped structures on the transparent base material is substantially in a shape of a rectangle;

the metasurface lens is a geometric phase metasurface lens;

the plurality of microstructures in the geometric phase metasurface lens include a plurality of rectangular prisms, and axes of the plurality of rectangular prisms are substantially perpendicular to the transparent base material;

sizes of the plurality of rectangular prisms are approximately equal, and a rotation angle of each of the plurality of rectangular prisms is proportional to a phase change amount of light passing through the geometric phase metasurface lens; and each of the plurality of loop-shaped structures includes multiple rectangular prisms, and rotation angles of the multiple rectangular prisms are equal.

15. The transparent display panel according to claim 14, further comprising:

a polarizer disposed between the geometric phase metasurface lens and the light exit control layer, the polarizer being configured to convert light entering the geometric phase metasurface lens from the light exit control layer from linearly polarized light to circularly polarized light.

16. A display device, comprising:

the transparent display panel according to claim 14; and at least one side-type collimated light source disposed at at least one side of the second substrate in the transparent display panel.

17. Glasses, comprising:

a support structure; and at least one transparent display panel according to claim 14 installed on the support structure.

* * * * *